Nov. 9, 1954 J. E. WALSTROM 2,694,179
METHOD FOR ELECTRICAL WELL-LOGGING
Filed March 13, 1950 4 Sheets-Sheet 1
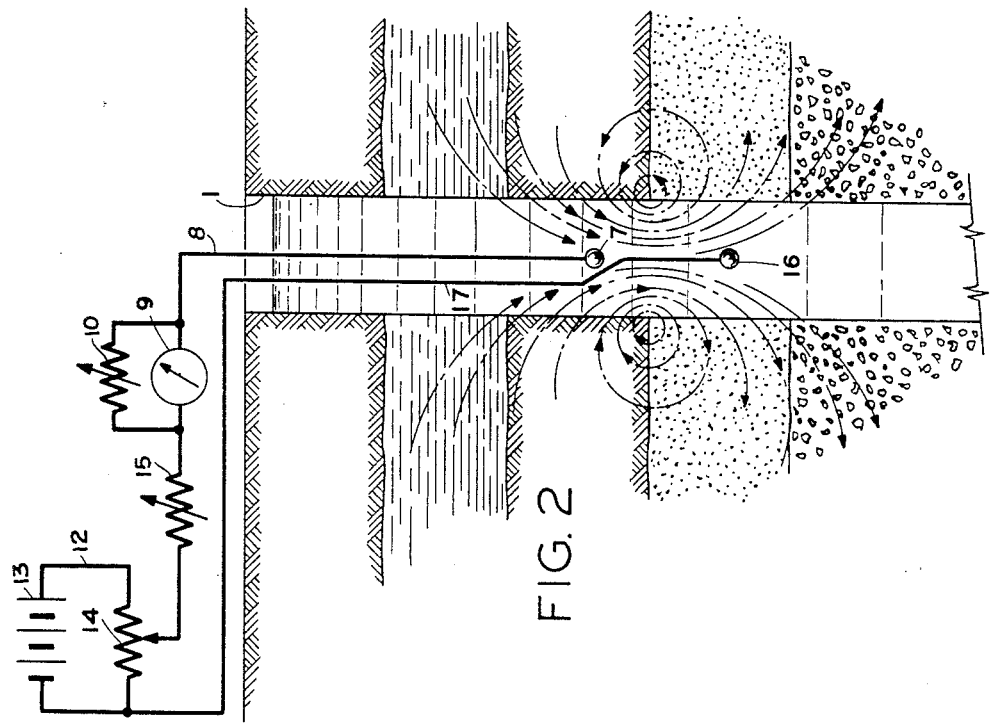
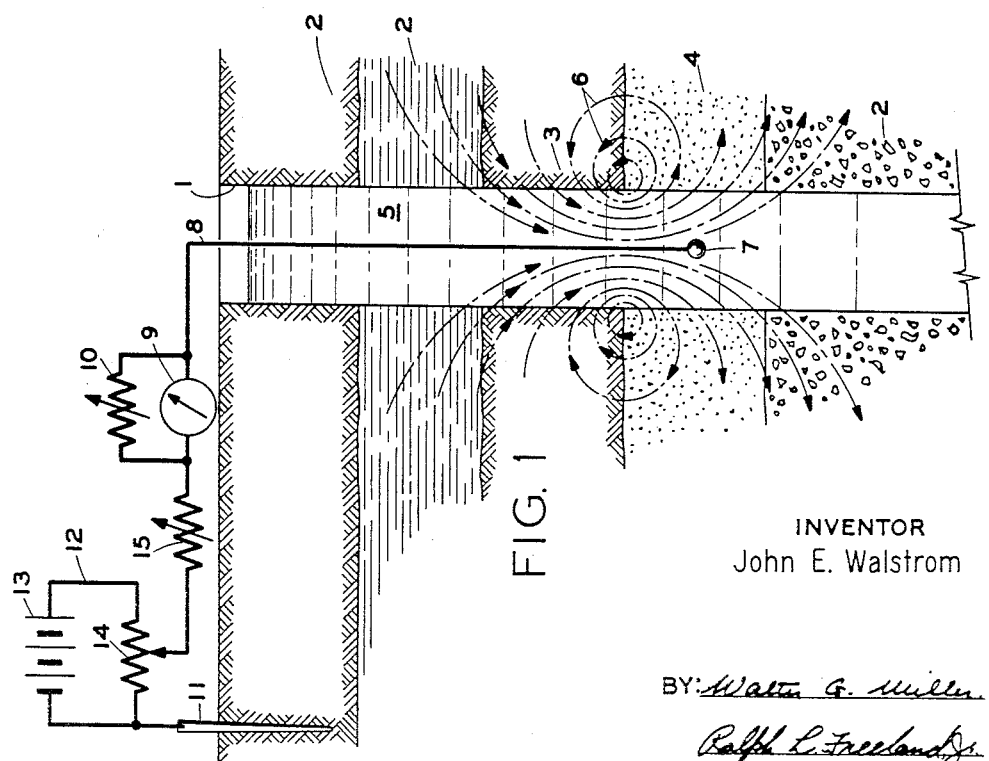
INVENTOR
John E. Walstrom
BY: *Walter G. Miller*
*Ralph L. Freeland Jr.*
ATTORNEYS

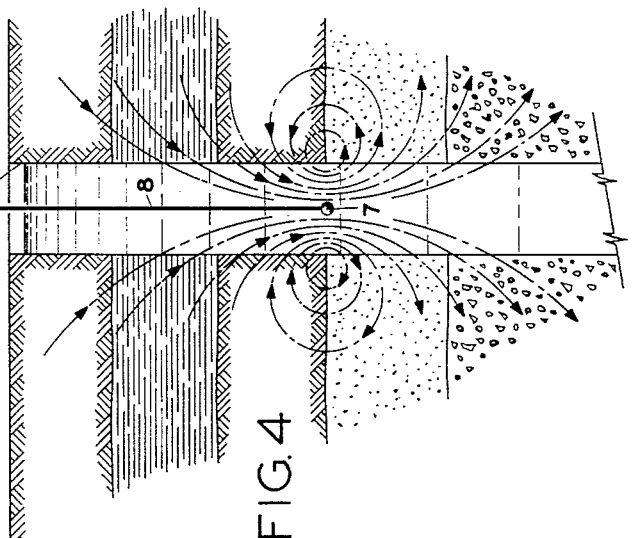
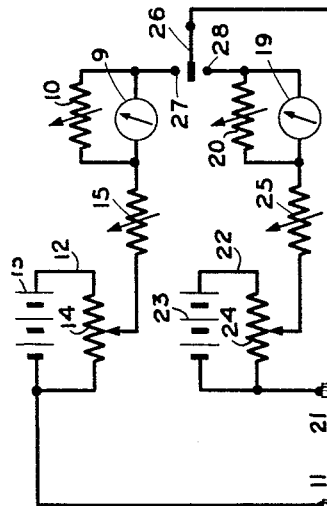
FIG. 4
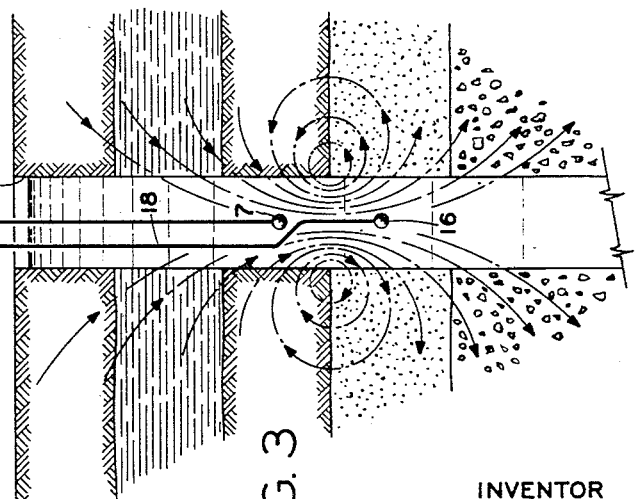
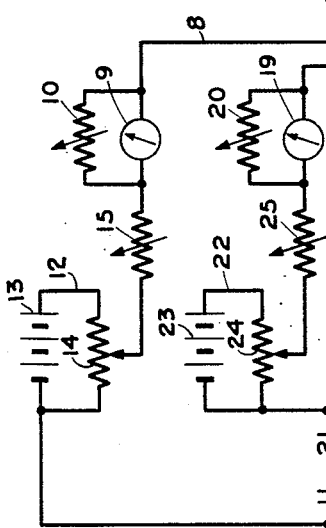
FIG. 3
INVENTOR
John E. Walstrom
BY:
ATTORNEYS Nov. 9, 1954  J. E. WALSTROM  2,694,179
METHOD FOR ELECTRICAL WELL-LOGGING
Filed March 13, 1950  4 Sheets-Sheet 3

INVENTOR
John E. Walstrom
BY: *Walter G. Muller*
*Ralph L. Freeland Jr.*
ATTORNEYS Nov. 9, 1954    J. E. WALSTROM    2,694,179
METHOD FOR ELECTRICAL WELL-LOGGING
Filed March 13, 1950    4 Sheets-Sheet 4
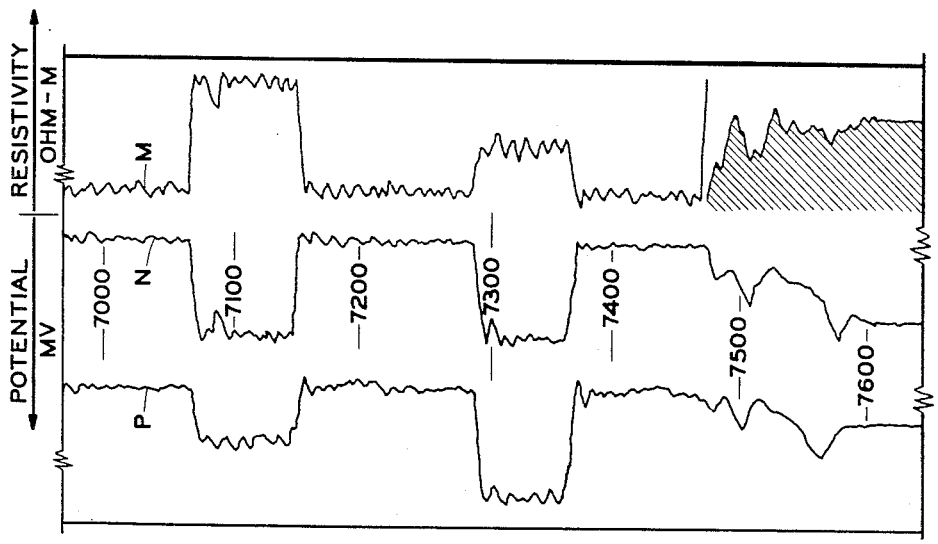
FIG. 9
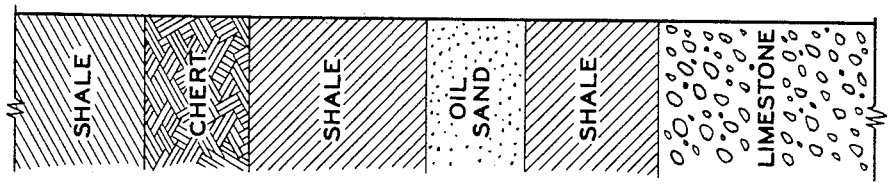
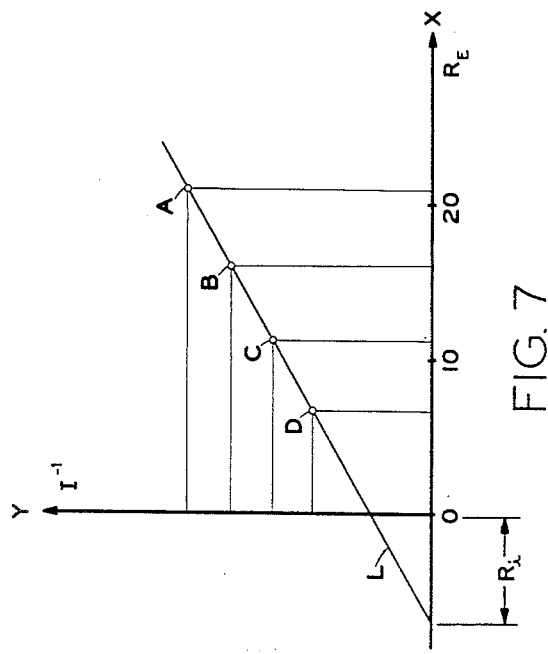
FIG. 7
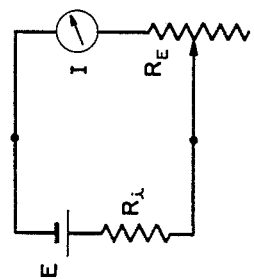
FIG. 8
INVENTOR
John E. Walstrom
BY: *Walter G. Miller*
*Ralph C. Freeland, Jr.*
ATTORNEYS United States Patent Office 2,694,179
Patented Nov. 9, 1954

2,694,179

METHOD FOR ELECTRICAL WELL-LOGGING

John E. Walstrom, Diablo, Calif., assignor, by mesne assignments, to California Research Corporation, San Francisco, Calif., a corporation of Delaware Application March 13, 1950, Serial No. 149,297

5 Claims. (Cl. 324—1)

The present invention relates to an improved method for electrically logging uncased wells or bore holes, and more particularly relates to an improved method for qualitatively investigating the nature of the strata traversed by an uncased well or bore hole.

It has long been appreciated in the art of well logging that the simplest and easiest means of investigating the physical nature of the strata traversed by an uncased well or bore hole is the electrical method. In the usual methods employed heretofore, these electrical determinations have most frequently taken the form of one or more resistivity measurements and a single measurement of the spontaneous potential existing in the well bore. These measurements are ordinarily continuously recorded throughout the entire length of the uncased well bore and in combination with other lithological information, may enable the user to better identify the fluid content of the formation.

The resistivity measurements in conjunction with other information may often serve to differentiate between the various strata which contain salt water and those which contain petroleum since the presence of petroleum is indicated by increased resistivity. However, increased resistivity alone may also be due to low porosity of the formations or fresh water or both. Thus, a high value of resistivity does not necessarily indicate the presence of petroleum-bearing strata. Accordingly, it is necessary to have further lithological information before the increased resistivity in one stratum, as compared to another, can be tentatively identified as due to the presence of petroleum. The phenomenon which assists in this further identification of the nature of the strata is the natural, or spontaneous potential, frequently abbreviated as s. p., existing in the well bore and which may be recorded by the same array of electrodes utilized in the resistivity measurements. These potential measurements are made with only the natural, or spontaneous, potentials generated in the bore hole acting as the current producing source. While the exact nature and source of these potentials have not been fully identified, it is well known that they do exist and have been shown experimentally to be at least partly the product of electrochemical action, due to the interaction of clay-like materials such as shale, fresh-water drilling mud, and salt-water saturated sand.

In the case of a log made in a development well, it may often be that the resistivity curves and the potential curves are satisfactory for identifying the fluid content of the strata and, in a qualitative manner, the permeability or porosity of the formations. However, in a log made in an exploratory well, where little lithological information is available, the formations so identified by the electric log as being permeable, or porous, have sometimes turned out to be formed of impervious materials, such as non-fractured chert, limestone, or compacted shale. Accordingly, it has been found necessary in most instances to investigate the well formations by further and more exhaustive means, such as formation testing and coring. However, due to the expense of these last-mentioned operations, they are employed as little as possible.

Accordingly, there has long been a need for a method for better determining the presence of porous or permeable strata or, conversely stated, the absence of non-porous strata, traversed by a well bore by means of electrical logging apparatus, since the operation of such equipment is economical to employ and easily applied as compared to other formation evaluation techniques.

In certain of its broader aspects, the novel method of electric logging, in accordance with the present invention, comprises the step of measuring or otherwise determining qualitatively the internal resistance characteristic of the potential generating source of the spontaneous or natural currents generated in a bore hole. In addition, the present invention contemplates novel apparatus for measuring the internal resistance characteristic of the potential generating source of the spontaneous currents existing in a well or bore hole.

While some of the apparatus proposed for the practice of the present invention is similar to or even identical with that conventionally employed in electrical logging, the novelty of the present invention resides in the method or sequence of operations involving the determination of electrical characteristics that were hitherto unknown and unappreciated as indicative of formation characteristics. However, in addition to the conventional apparatus which may be adapted to practice the method of this invention, novel arrangements for the carrying out of the subject method are disclosed which may be adapted for conducting conventional electric logging procedures.

It is therefore an object of the present invention to provide an improved method of qualitatively determining the nature of strata by the measurement of self or natural potentials along a well bore under at least two different circuit load conditions employing well known electrical well logging equipment.

It is a further object of the present invention to provide a less expensive method for qualitatively determining the porosity or non-porosity of strata traversed by a well bore, which includes successively logging the self-potentials along the well bore with at least two different values of total resistance connected in the measuring circuit.

Further objects and advantages of the present invention will become apparent from the following description taken in conjunction with the accompanying drawings which form an integral part of the present specification.

In the drawings,

Fig. 1 is a schematic representation of a well logging apparatus of the single-electrode type which may be used in the practice of the invention.

Fig. 2 is a schematic representation of a 2-electrode apparatus which may be used in the practice of the method disclosed in the present invention.

Fig. 3 is a schematic representation of a well-logging arrangement, providing two circuits, each similar to the circuit of Fig. 1, for practicing the invention.

Fig. 4 is an alternative well-logging arrangement providing measurements similar to those made by the circuits of Fig. 3 but utilizing only one insulated lead.

Fig. 7 is a graphical representation of the manner in which the internal resistance characteristic of a conventional cell, similar to the cells produced in the earth formations traversed by a bore hole, may be evaluated from data giving the current flowing at various external resistances.

Fig. 8 is an elementary circuit diagram of the potential generating and measuring circuit utilized to establish the values plotted in Fig. 7.

Fig. 9 is a schematic representation of the earth formations traversed by a bore hole, as interpreted through the use of a typical electric log produced by the practice of the present invention.

Figure 6:
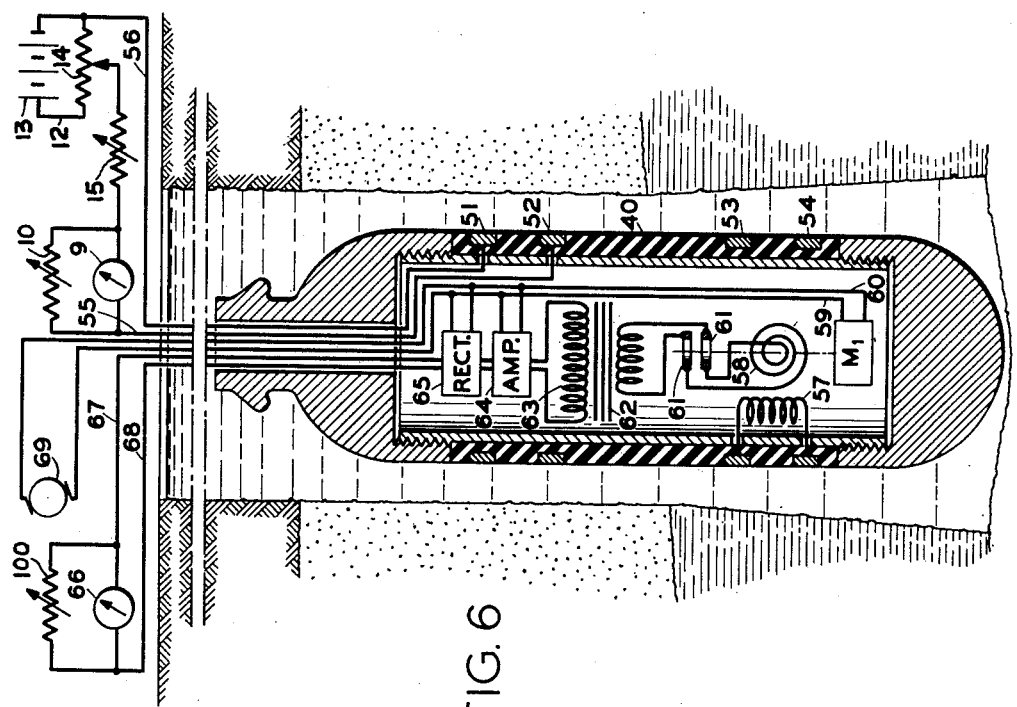
Fig. 6 is an alternative arrangement of an electric well-logging apparatus, similar to that shown in Fig. 5.

Referring now to the drawings, and particularly to Fig. 1, there is shown a conventional single electrode circuit for measuring the bore hole potential, which for simplicity of explanation is shown in a simplified, schematic form. As there shown, a bore hole 1 produced by conventional means, such as rotary drilling, traverses a series of earth strata 2. Strata 2, in general, may be considered to include formations such as shale 3, and sandstone 4 which may be saturated with salt water. According to the present theory of generation of natural, or spontaneous potentials, the presence of a fresh water mud 5 in bore hole 1 will establish an electric current field approximately in accordance with the current lines 6, the smallest of which is centered about the common intersection of the sand, shale and bore hole. In conventional recording of the potential curve in electric well-logging, the potential field in the drilling fluid as established by the flow of electric current as depicted is detected at the earth's surface by a circuit such as that provided by a down-hole electrode 7 connected by an insulated cable 8 to a recording galvanometer 9 which may be shunted by a variable shunt resistor 10. The opposite terminal of galvanometer 9 is connected to a surface ground-electrode 11 through a potentiometer circuit 12, which may comprise a battery 13 and a variable potentiometer 14, and a variable series resistor 15.

In conventional practice, it has been customary to record the output of galvanometer 9 in a single upward pass or traverse of the down-hole electrode 7 from the bottom of well bore 1 to the surface of the ground or to the deepest metal casing placed in the bore hole. In this single-pass recording operation, variable potentiometer 14 and shunting resistor 10 are adjusted so that the maximum deflections of galvanometer 9 may be recorded satisfactorily on the record strip. A full scale value of potential of 100 millivolts is ordinarily found practical and satisfactory. Series resistor 15 is normally provided to insure a very small current flow by providing a very high resistance in the series circuit.

The conventional electric log potential records merely represent the potentials present in the bore hole, as modified by the drilling fluid present, and in no way represented an absolute value of the electromotive force of the potential cell.

As distinguished from this prior practice of only recording during a single passage of electrode 7 through the well bore 1, I have found that, by providing a range of resistance values for resistor 15 which is in series with galvanometer 9, and then preselecting the values of resistance for resistor 15, it is possible to provide a means of obtaining at least two separate and different potential curves under different conditions of external load resistance. These distinct potential curves may then be used to qualitatively evaluate or determine the hitherto overlooked internal resistance characteristic of the natural current generating sources. This may be accomplished by suitably changing the total circuit current flowing in the measuring circuit and at the same time preferably, but not necessarily, adjusting the galvanometer sensitivity to its original value by properly adjusting resistor 10. In this way two potential curves of different, but comparable, deflection magnitudes may be obtained. By then comparing these distinct potential curves, according to the procedure which will be described in further detail below, a novel method of further and more fully investigating the physical characteristics of the earth strata has been provided since the internal resistance characteristic of the generating source is dependent upon the nature of the strata which form a part of the generating cell, or source, that produces these natural potentials. This is believed to be due to the fact that the porosity of the strata determines to a large extent the amount of conductive, or non-conductive, fluids present in the formation.

Since the operation of the circuit shown in Fig. 1 will be best understood in connection with the explanation of the electric well logs shown in Fig. 9 described hereinafter as well as the method of evaluating these logs as described in conjunction with Figs. 7 and 8, the details of a preferred method of operating the apparatus of Fig. 1 will be discussed in conjunction with those figures.

Referring now to the alternative arrangement of well-logging apparatus schematically shown in Fig. 2, it will be noted that the apparatus is substantially similar to that shown in Fig. 1 with the exception that the left-hand side of potentiometer 14 is connected to another down-hole electrode 16 through insulated conductor 17 instead of to ground-electrode 11. Electrode 16 is preferably spaced longitudinally from electrode 7 in such a manner that the intervening potentials existing in the bore hole 1 may be detected between electrodes 7 and 16. The circuit elements of the arrangement shown in Fig. 2 are identified by the corresponding numbers to those shown in Fig. 1 and operate in the same manner. The spacing of electrodes 7 and 16 may be of the order of from 1 to 5 feet.

Fig. 3 shows an alternative arrangement employing two circuits similar to that shown in Fig. 1. It will be noted that a separate indicating, or recording, circuit is connected to down-hole electrode 16, which in the present instance is connected through insulated lead 18 to a second galvanometer 19 which is shunted by a resistor 20. The opposite side of galvanometer 19 may be connected to a separate ground-engaging surface electrode 21 through a potentiometer circuit 22 and a series resistor 23. The purpose of the second galvanometer circuit is to provide a means for indicating, or recording, the well bore potentials under two different values of external circuit resistance by a single passage of the well logging electrodes through the well bore 1.

Fig. 4 shows another alternative well-logging arrangement similar to that shown in Fig. 3 in which a single electrode 7 is arranged to be passed through bore hole 1 by means of cable 8 and alternately connected to the indicating circuits provided by a first galvanometer 9 and a second galvanometer 19 by means of a commutator switch 26 which is adapted to periodically oscillate between contactors 27 and 28. By the present arrangement, it is possible to record simultaneously and with sufficient accuracy the current flow in the two galvanometer circuits connected to instruments 9 and 19 under different resistance loading conditions by the passage of only a single electrode 7 through bore hole 1. Such a method as that shown in the present arrangement allows two curves to be recorded using only a single lead in those cases in which a minimum number of leads, or conductors, must be employed.

Figure 5:
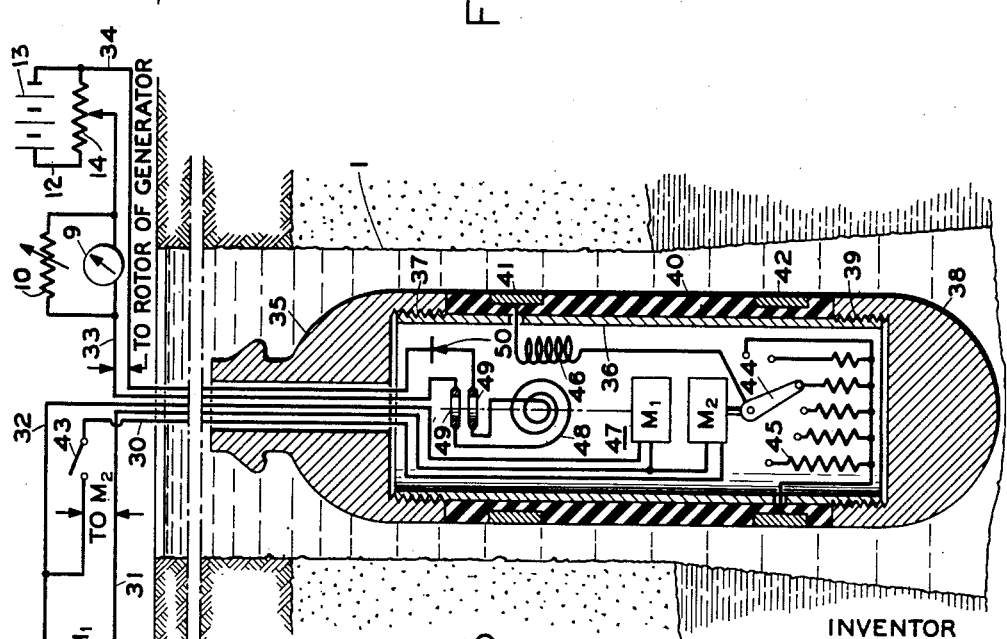
Fig. 5 is a novel electrical well-logging apparatus which may be employed in the practice of the method disclosed by this specification and which provides a multiplicity of measurements and also eliminates the resistance of the cable leads.

Referring now to the apparatus shown in Fig. 5, it will be noted that a novel well-logging device for practicing the method of the present invention has been provided which is adapted to be lowered into the bore hole 1 by a multi-conductor cable which may include the five leads 30, 31, 32, 33 and 34 which are connected to the control and indicating apparatus. In general, this well-logging tool comprises a head 35 which is adapted to be screwed onto the upper portion of a hollow cylinder member 36 by means of screw threads 37. The lower portion of cylinder member 36 is sealed by end cap 38 which is secured to cylinder 36 by screw threads 39. The outer wall of cylinder 36 is preferably provided with an insulating sheath 40 upon which may be mounted a pair of circular electrode rings 41 and 42. Electrodes 41 and 42 may be so positioned on sheath 40 that the desired spacing of the electrodes may be obtained for detecting the spontaneous potentials present in the well between a desired interval.

In order to detect the natural potentials existing between electrodes 41 and 42 under varying load conditions and to provide a measuring circuit for the current generated by these natural potentials, provision has been made to operate stepping motor M–2 which is adapted to be energized through conductor leads 30 and supplied by a suitable source of electric power, such as generator 29, through switch 43. By the operator of motor M–2, contactor arm 44, which is mounted on the motor shaft, may be moved to any of the contact points connected to the plurality of resistors 45 that may be of preselected, stepped values and which have their opposite ends connected to electrode 42. The opposite side of movable contactor 44 is adapted to be connected to the field coil 46 of an alternating current generator, or alternator, designated generally as 47, which may be continuously driven by motor M–1. Motor M–1 may be energized through lines 31 and 32 by the same source of power used for motor M–2. The opposite side of field coil 46 is connected to well electrode 41 so that the magnetic field intensity in field coil 46 will be proportional to the current flowing between electrodes 41 and 42. By this arrangement the current produced by the well bore potential acts to produce an alternating potential. The output of armature 48 may be connected to a pair of slip rings 49 to provide a current flow through lines 33 and 34 which may be utilized to operate galvanometer 9 with its deflection adjusting potentiometer 12, 13, 14, in much the same manner as the directly connected current electrodes used in Figs. 1 to 4. For the purpose of converting the alternating current generated in alternator 47 to a direct current, a rectifier 50 may be provided between the connection to one of the slip rings 49 and cable lead 34. An important advantage of this arrangement is that the minimum value of external circuit resistance which includes the resistance of the conductor connected to the down-hole electrode, may be reduced to almost zero. Since the resistance of the down-hole conductor is generally dependent upon length, in certain cases it may be very important to exclude as much of this resistance as possible.

With reference now to an alternative well logging apparatus shown in Fig. 6, it will be noted that four potential electrodes, 51, 52, 53, and 54, have been positioned on insulating sheath 40 of a well logging tool similar to that shown in Fig. 5. In this embodiment, electrodes 51 and 52 are adapted to be connected through a pair of cable leads 55 and 56, respectively, to a galvanometer circuit 9 on the earth's surface in a conventional manner. In this arrangement the resistance of the cable leads 51 and 52 are unavoidably included as a part of the total circuit resistance. However, in this circuit the cable lead resistance is not detrimental since a very high external circuit resistance is desirable. Electrodes 53 and 54, on the other hand, are arranged to be connected directly to an alternator, or A. C. generator, field coil 57 to provide an alternating current output from armature 58 which is proportional to the potential between electrodes 53 and 54. In this circuit a very low external circuit resistance is desirable and the cable lead resistance is completely excluded. By this arrangement, two circuits having quite different external circuit resistances may be obtained. Motor M–1 which drives armature 58 is arranged to be driven by power supplied through lines 59 and 60, which are connected to a suitable source of electric power, such as generator 69, at the earth's surface. However, as distinguished from the arrangement shown in Fig. 5, the output of armature 58 is applied from slip rings 61 to a high impedance transformer 62 whose secondary coil 63 is connected to an amplifier 64 and the amplified A. C. output potential may then be converted to a D. C. potential by rectifier 65. In this manner only D. C. is transmitted over the cable leads, since the output of rectifier 65 may be connected to galvanometer 66 which is located on the surface by means of leads 67 and 68. It will be noted that rectifier 65 and amplifier 64 are likewise arranged to be energized through power supply lines 59 and 60. The arrangement shown in Fig. 6 thus provides two measurements of well bore potential, one measurement at a relatively high external circuit resistance and the other measurement at a relatively low external circuit resistance.

Reference is now made to the graph shown in Fig. 7 and the elementary diagram shown in Fig. 8 which are representative of the values to be measured by the apparatus described in the foregoing figures. As shown, particularly in Fig. 8, the ammeter $I$ is connected in series with a variable resistance $Re$ to a source of potential $E$, represented as a battery which has an internal resistance $Ri$. In the measurement of current flow through an external resistance $Re$, it can be shown that the reciprocal of the current $(1/I)$ will vary directly as the sum of $Re+Ri$. For this reason, when the internal resistance of the generating source $E$ represented by $Ri$ cannot be directly measured, it can be shown as in Fig. 7 that the external resistance may be plotted against the reciprocal of the current for that particular value of external resistance to establish a point A. Then, by varying the external resistance by altering the value of $Re$, it will be apparent that a new value of $Re$ and $1/I$ may be plotted as point B. In the same manner, points C and D may likewise be obtained if they are so desired and these points inter-connected by the straight line L which may be extrapolated to the point where it crosses the X axis. In this manner, it may be demonstrated that the intercept on the X axis, which is represented by the distance from $Re=0$ to the point where line L crosses the X axis gives the internal resistance $Ri$ of the potential source.

In accordance with this invention, there is obtained a determination of the magnitude of the internal, or self-resistance of the formations which indicates qualitatively the degree of porosity, or lack of porosity, of the earth strata. Accordingly, in the apparatus shown in Figs. 1 through 6, the primary purpose of the variable resistance in the galvanometer circuit is to provide a means for obtaining at least two distinct conditions of current loading to permit an analysis of the internal resistance characteristics of the spontaneous potential sources originating in the formations and created when a well bore traverses geological strata of different physical properties, such as a sand-shale series.

As a representation of the information which may be obtained by the process disclosed by this invention, a typical well log is shown in Fig. 9 in which, at the left side, the strata traversed by the bore hole are labeled in accordance with the lithological nature of the materials as determined by coring or sidewall sampling, while at the right there is shown a typical electric log, or current profile, of these formations. Curve M will be recognized at the usual resistivity log which may be obtained by any conventional resistivity measurement method. Curve N is, in general, representative of the typical potential curve such as is made in any conventional electric logging operation, but produced at only one, and usually a high, value of external circuit resistance. It will be particularly noted in this regard that at the 7100-foot interval the resistivity curve shows a high resistivity and, likewise, the potential curve N shows a high potential. However, actual side-wall sampling or coring proved that the formation was tight and impervious chert, and not a porous or permeable formation, as may be construed from the appearance of the conventional log. However, I have found that by noting the external resistance when curve N was made and then changing the external circuit resistance, for instance, to a very low value, a further potential curve P could be run in which the potential curve will be noted to be substantially different than the original curve N. A comparison and study of the differences in the two curves N and P permits a qualitative evaluation of the internal characteristics of the media traversed and thereby a better evaluation of the physical characteristics of the strata and more particularly the porosity and fluid content thereof.

In the operation of the apparatus shown in Figs. 1 and 2, in accordance with the teaching of this invention, it will be readily apparent to those skilled in the art, that potential curve N, as shown in Fig. 9, may be produced by first selecting a very high resistance value for variable resistor 15, adjusting the galvanometer sensitivity and then traversing the well bore with electrode 7, or in the case of Fig. 2 both electrodes 7 and 16. Curve P would then be developed by selecting another value, for instance very low, of external resistance by means of resistor 15, again adjusting the galvanometer sensitivity to the same scale value and then repeating the traverse of bore 1 with the electrodes and recording the values indicated by galvanometer 9. It will, of course, be obvious, that if a particular stratum traversed by the well bore appears to be of particular interest, then several different values of resistance 15 may be selected, and the current or potential values measured by galvanometer 9 may be recorded. In this way, discrete segments or points of the curve may be analyzed in accordance with the graph shown in Fig. 7, by plotting the reciprocal of the current versus the external resistance values to determine the apparent internal resistance of the earth system at the horizon in question.

Alternative to the arrangements shown in Figs. 1 and 2, the apparatus shown in Fig. 3 may be utilized to simultaneously produce curves N and P by selecting very different values for the series resistors 15 and 25, and simultaneously recording the potential, or current, indications on galvanometers 9 and 19.

A still further alternative to the arrangement in Fig. 3 is provided by the apparatus shown in Fig. 4 for simultaneously recording curves N and P by withdrawing electrode 7 from the bottom of the well bore to the surface of the earth and periodically, or cyclically, moving contactor 26 between stationary contactors 27 and 58 to successively energize galvanometers 9 and 19, which are connected to surface electrodes through series resistors 15 and 25, which may be set at different values of resistance. This system thus utilizes only one insulated conductor rather than two as in Fig. 3.

In regard to the operation of the novel apparatus as shown in Fig. 5 which may be used in the practice of the method disclosed by this invention, it will be noted that potential sampling electrodes 41 and 42 are arranged to traverse the bore hole 1 when the apparatus is lowered or raised by means of the insulated cable, which includes leads 30, 31, 32, 33 and 34. For the purpose of providing a different circuit resistance for each traverse of the bore hole by the logging tool, the plurality of resistors 45 are arranged to be of different resistance values so that the total circuit resistance between electrodes 41 and 42 may be changed at will from almost zero resistance to a very high value. The placing of the resistors in the down-hole instrument provides a measuring circuit capable of excluding the resistance of the cable leads and thus obtaining a much lower value of external circuit resistance than is possible with the logging apparatus shown in Figs. 1 through 4.

As stated hereinbefore, movable contactor 44 is adapted to engage the ends of any of the resistors 45 by operation of stepping motor M–2 which is energized through lines 30 and 31. With movable contactor 44 connected to one of the resistances 45, the total current flowing in field coil 46 of alternator 47 will vary in accordance with the potential existing between electrodes 41 and 42. Then, with armature 48 being rotated at a constant speed by drive motor M–1, an alternating current potential will be impressed upon slip rings 49 which is proportional to the current in the potential responsive circuit comprising coil 46 and one of the resistors 45. The alternating current output of alternator 47 may then be applied to the galvanometer 9 at the earth's surface through rectifier 50 and the cable leads 33 and 34. It will be apparent that with the apparatus shown in Fig. 5 as many traverses may be made of the bore hole as there are different external resistances provided by resistors 45. It should again be noted that by placing the resistors in the down-hole instrument the total circuit resistance may be made much lower in value than that of a single cable lead. In order to reduce the total circuit resistance even lower it may be desirable to employ larger sizes of potential electrodes to contact the drilling fluid in the well bore.

With reference to the operation of the apparatus shown in Fig. 6, it will be noted that curves P and N may be recorded simultaneously by the provision of two separate pairs of potential sampling electrodes adapted to be connected to separate measuring circuits. One of these circuits is provided through electrodes 51 and 52 which are directly connected to galvanometer 9 by leads 55 and 56 to provide a high external resistance circuit in the same manner as the apparatus shown in Fig. 2. At the same time the second potential measuring circuit is provided by electrodes 53 and 54 which are connected in a very low resistance circuit to field coil 57 of an alternator driven at constant speed by motor M–1 for the same purpose as described in connection with Fig. 5. However, in the present apparatus the output of armature 58, which varies in accordance with the potential existing between the electrodes connected to field coil 57, is applied to slip rings 61 and then connected to the primary winding of a high impedance transformer 62. The purpose of this latter arrangement is to provide a more satisfactory coupling arrangement to the input of amplifier 64, since the input impedance of amplifier 64 can be better matched to the impedance of secondary winding 63 of transformer 62 than to the output of the alternator. However, since it is desirable to transmit a D. C. signal to galvanometer 66 at the surface, in order to remain free of the inductive and capacitive effects between the cable leads, a rectifier 65 is preferably interposed between the output of amplifier 64 and cable leads 67 and 68.

Since it has been found that the internal resistance of the generating source of the spontaneous potential produced in a well bore bears a relationship to the physical characteristics and particularly to the porosity of the formations traversed by a well bore, a novel method has been provided by the present invention for qualitatively differentiating the porous and non-porous strata in a well.

While the apparatus shown in Figs. 1 to 4 have been described only as applied to the study of spontaneous potentials, it will be apparent to those skilled in the art that resistivity measurements may be made with such apparatus in the conventional manner. Likewise, the adaptation of present conventional electrical logging equipment well known in the art to my novel method may be made without departing from the teaching of my invention.

Since it is well understood in the art that current and potential are interrelated in the measurement of either value, when the terms spontaneous current, or potential, are used in the claims I intend to include the complementary measurable quantity since whether current or potential is measured, is merely a matter of choice by the operator of the measuring circuit.

While various modifications and additions to the invention disclosed herein will occur to those skilled in the art, all such modifications and additions in the method as fall within the scope of the appended claims are hereby included, and I therefore intend to limit the scope of the invention only within the terms of said claims.

I claim:

1. The method of investigating the physical characteristics of strata traversed by a bore hole which comprises the steps of detecting continuously along the bore hole the self-potential current flowing in a measuring circuit means connected to two electrodes, at least one of which is in the bore hole, and recording separate detected current profiles for the same length of bore hole each under a different resistance load condition of said measuring circuit means.

2. The method of qualitatively investigating the porosity and fluid content of earth strata traversed by a bore hole which comprises the steps of establishing an electrical measuring circuit between a pair of electrodes, at least one of said electrodes being disposed in said bore hole, recording continuously the natural potentials between said electrodes as the hole electrode traverses said bore hole, then varying the resistance of said measuring circuit and again recording the natural potentials between said electrodes to determine the internal resistance characteristic of the earth system traversed by said hole electrode, whereby the porosity and fluid content characteristics of said strata may be evaluated.

3. The method of electrically logging an uncased well bore which includes the step of traversing said bore hole with an electrode system adapted to detect the self potentials existing therein, measuring and recording the potentials detected by said system under a first resistance load condition for the measuring circuit, and then measuring and recording the potentials detected under another resistance load condition for said measuring circuit.

4. The method of operating a spontaneous potential measuring circuit for an electrical logging system comprising the steps of adjusting the external resistance in series with the measuring circuit to a first value, adjusting the potentiometer circuit to produce a maximum deflection condition for the potential responsive instrument, recording the potential deflections of said instrument on a well-depth axis, then re-adjusting said external resistance to a value different than said first value, adjusting the potentiometer circuit and recording the potential deflections of said instrument on a well-depth axis.

5. The method of electrically logging an uncased well bore which includes the step of traversing said bore hole with an electrode system comprising at least two electrodes, each adapted to detect the self potentials existing therein, and separately measuring the potentials detected by one of said electrodes under a first resistance load condition for the measuring circuit, and the potentials detected by another of said electrodes under another resistance load condition for the measuring circuit.

References Cited in the file of this patent

UNITED STATES PATENTS

| Number | Name | Date |
| --- | --- | --- |
| 1,299,252 | Slepian | Apr. 1, 1919 |
| 1,913,293 | Schlumberger | June 6, 1933 |
| 1,966,105 | Ostermeier | July 10, 1934 |
| 2,087,995 | Nolke | July 27, 1937 |
| 2,217,435 | Edler | Oct. 8, 1940 |
| 2,300,709 | Smith | Nov. 3, 1942 |
| 2,347,794 | Piety | May 2, 1944 |
| 2,371,270 | Smith | Mar. 13, 1945 |
| 2,376,168 | Mounce | May 15, 1945 |
| 2,388,141 | Harrington | Oct. 30, 1945 |
| 2,393,009 | Chun | Jan. 15, 1946 |
| 2,404,622 | Doan | July 23, 1946 |
| 2,415,364 | Mounce | Feb. 4, 1947 |
| 2,501,953 | Martin | Mar. 28, 1950 |